(12) United States Patent
Basavanhally et al.

(10) Patent No.: US 6,975,788 B2
(45) Date of Patent: Dec. 13, 2005

(54) OPTICAL SWITCH HAVING COMBINED INPUT/OUTPUT FIBER ARRAY

(75) Inventors: Nagesh R. Basavanhally, Killman, NJ (US); Mark A. Paczkowski, Andover, NJ (US); Hong Tang, Belle Mead, NJ (US); John D. Weld, Ledgewood, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 182 days.

(21) Appl. No.: 10/314,768

(22) Filed: Dec. 9, 2002

(65) Prior Publication Data

US 2004/0109634 A1 Jun. 10, 2004

(51) Int. Cl.[7] .............................. G02B 6/35; G02B 6/32
(52) U.S. Cl. .............................. 385/18; 385/19; 385/93; 385/94; 385/119
(58) Field of Search ........................ 385/16–24, 88–94, 385/115–119

(56) References Cited

U.S. PATENT DOCUMENTS

| | | | |
|---|---|---|---|
| 4,208,094 A | * | 6/1980 | Tomlinson et al. ............ 385/18 |
| 4,484,793 A | * | 11/1984 | Laude .......................... 385/22 |
| 4,498,730 A | * | 2/1985 | Tanaka et al. ................. 385/18 |
| 5,056,886 A | * | 10/1991 | Hoult ........................... 385/20 |
| 5,135,590 A | | 8/1992 | Basavanhally et al. ....... 156/64 |
| 5,185,846 A | | 2/1993 | Basavanhally et al. ..... 385/137 |
| 6,265,239 B1 | | 7/2001 | Aksyuk et al. ............... 438/52 |
| 6,300,619 B1 | | 10/2001 | Aksyuk et al. .............. 250/216 |
| 6,366,414 B1 | | 4/2002 | Aksyuk et al. .............. 359/822 |
| 6,392,221 B1 | | 5/2002 | Aksyuk et al. .............. 250/216 |
| 6,408,120 B1 | | 6/2002 | Dautartas ...................... 385/52 |
| 6,429,976 B1 | | 8/2002 | Yamamota et al. .......... 359/641 |
| 6,507,683 B2 | * | 1/2003 | Sugitatsu et al. ............. 385/18 |
| 6,628,856 B1 | * | 9/2003 | Costello et al. ............... 385/18 |
| 6,766,085 B2 | * | 7/2004 | Fouquet et al. ............... 385/52 |
| 2004/0071393 A1 | * | 4/2004 | Staket et al. .................. 385/18 |
| 2004/0076366 A1 | * | 4/2004 | Yun et al. ..................... 385/18 |

FOREIGN PATENT DOCUMENTS

JP          200019357 A   *   1/2000   ............ G02B/6/42

OTHER PUBLICATIONS

"Optoelectronic Packaging", by Alan R. Mickelson, Nagesh R. Basavanhally, and Yung–Cheng Lee, Wiley–Interscience Publication, 1997 ASME, pp. 153–157.

* cited by examiner

Primary Examiner—Michelle R. Connelly-Cushwa (57) ABSTRACT

An optical switch has an array of fibers, an optional lens, and a mirror with two-dimensional tilt adjustment. Light from the array passes through the lens, is reflected by the mirror, and passes again through the lens back towards the array. The input/output fibers are arranged in a two-dimensional pattern designed to avoid undesirable crosstalk between fibers. The pattern may include a plurality of fibers positioned around a central fiber in a circular arrangement. For a 1×8 or 8×1 switch, nine fibers are preferably positioned in a circle around the central fiber, thereby providing geometry that substantially avoids undesirable crosstalk between fibers in the array. In another implementation, the fiber array is implemented using a tapered ferrule housing a central fiber, surrounded by an intermediate layer of six fibers, surrounded by an outer layer of twelve fibers.

23 Claims, 7 Drawing Sheets

OPTICAL SWITCH HAVING COMBINED INPUT/OUTPUT FIBER ARRAY

BACKGROUND OF THE INVENTION

1. Field of the Invention

The invention relates to optical communication systems, and, in particular, to optical switches implemented using micro-electro-mechanical system (MEMS) technology.

2. Description of the Related Art

Optical communication systems transmit information from source nodes to destination nodes in the form of modulated optical signals. A typical optical communication system includes a network of nodes interconnected by optical fibers. In addition to transmitting optical signals between nodes over the optical fibers, a so-called all-optical system has nodes that are able to route optical signals between input and output ports in the optical domain, i.e., without having to convert the optical signals into the electrical domain. Typical all-optical routing nodes are implemented using arrays of 1×M and M×1 optical switches to receive incoming optical signals at their corresponding input ports and present those signals as outgoing optical signals at their desired output ports.

In particular, a 1×M optical switch has a single input fiber and M output fibers. In operation, a 1×M optical switch receives an optical signal from the input fiber and selectively routes that optical signal to one (and only one) of the M output fibers. Similarly, an M×1 optical switch has M input fibers and a single output fiber. In operation, an M×1 optical switch selectively receives an optical signal from one of the M input fibers and routes (only) that optical signal to the output fiber.

A 1×M or M×1 optical switch, where M>2, may be implemented using a cascade of 1×2 or 2×1 optical switches. For example, a 1×8 optical switch may be implemented using three levels of 1×2 switches: one 1×2 switch in a first level feeding two 1×2 switches in a second level, each feeding two of four 1×2 switches in a third level. By appropriately controlling the seven different switches, an optical signal received at the first-level switch can be routed to any one of the eight outputs of the four third-level switches.

One type of prior art 1×2 optical switch is a mechanical device that changes the direction of its received light between two outputs by mechanically inserting or removing an optical prism into or from the light path. Unfortunately, such mechanical devices have poor reliability, especially at higher switching speeds (i.e., the speed at which the configuration of a 1×2 switch can be changed from one output to another).

SUMMARY OF THE INVENTION

Problems in the prior art are addressed in accordance with the principles of the invention by an optical switch, which, for a 1×M or M×1 device, has a two-dimensional array of at least (M+1) optical fibers, an optional lens, and a mirror with two-dimensional tilt adjustment. In operation, light from the fiber array passes through the lens, is reflected by the mirror, passes again through the lens, and is directed back to the fiber array. In particular, when operated as a 1×M switch, the tilt of the mirror is controlled to reflect light from the single input fiber to any one (and only one) of the M output fibers. Similarly, when operated as an M×1 switch, the tilt of the mirror is controlled to reflect light from any one (and only one) of the M input fibers to the single output fiber. The invention may be implemented using MEMS technology.

In preferred embodiments, the input and output fibers are arranged in a two-dimensional pattern that is specifically designed to avoid undesirable crosstalk between fibers. In particular, the two-dimensional pattern is selected such that, when operated as a 1×M switch, light from the single input fiber is substantially coupled to only one of the M output fibers, and any light that may be received from any of the other output fibers is not substantially coupled to any of the output fibers or the input fiber. Similarly, when operated as an M×1 switch, light from only one of the M input fibers is substantially coupled to the single output fiber, and any light that may be received from the output fiber or any of the other input fibers is not substantially coupled to any of the input fibers or the single output fiber. As a result, undesirable crosstalk is substantially avoided in the 1×M and M×1 devices of the present invention.

In preferred implementations, the two-dimensional pattern for the fiber array includes a central optical fiber and a plurality of other optical fibers positioned around the central optical fiber, e.g., in a circular (or near circular) arrangement. When operated as a 1×M switch, the central fiber is the single input fiber and fibers on the circle form the M output fibers. Similarly, when operated as an M×1 switch, the central fiber is the single output fiber and fibers on the circle form the M input fibers.

In one particular implementation of a 1×8 or 8×1 switch, the pattern includes a single central fiber surrounded by a circular arrangement of nine fibers. Using nine fibers in the circular arrangement instead of eight provides geometry that substantially avoids undesirable crosstalk between fibers in the array.

In another implementation, the fiber array is a bundle of nineteen fibers arranged in a pattern having a single central fiber, surrounded by an intermediate layer of six fibers, surrounded by an outer layer of twelve fibers arranged in a circle or near circle centered at the central fiber. An optical switch having such a bundled fiber array can be operated as a 1×M or M×1 switch with 2≦M≦12. Here, too, the geometry substantially avoids undesirable crosstalk between fibers in the array.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

1×8 or 8×1 Optical Switch

Figure 1:
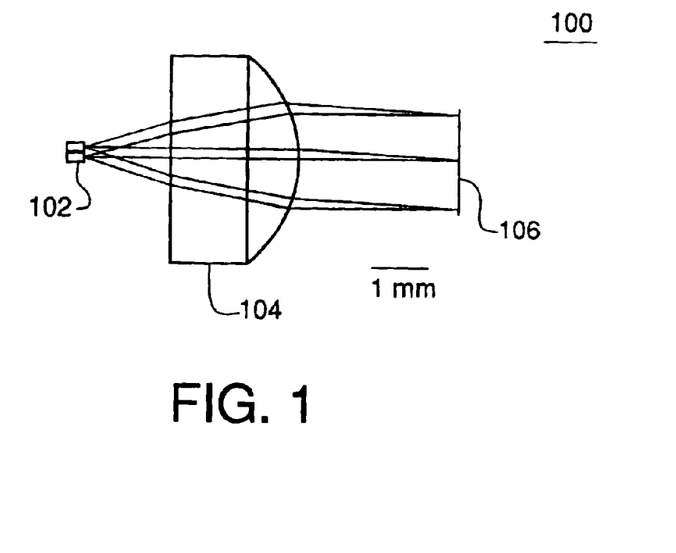
FIG. 1 shows a schematic cross-sectional view of an optical switch taken parallel to the optical transmission axis, according to one embodiment of the present invention.

FIG. 1 shows a schematic cross-sectional view of an optical switch 100 taken parallel to the optical transmission axis, according to one embodiment of the present invention. Optical switch 100 has a two-dimensional fiber array 102, an optional lens 104, and a mirror 106 with two-dimensional tilt adjustment (tilt control mechanism not shown), where the proximal end of fiber array 102 is preferably located at the front focal plane of lens 104 and the reflecting surface of mirror 106 is preferably located at the back focal plane of lens 104. With such a configuration, incoming light from fiber array 102 will pass through lens 104, reflect off mirror 106, pass again through lens 104, and be directed back to fiber array 102. FIG. 1 represents the light path between two optical fibers in the fiber array.

Although other types of mirrors and their control mechanisms are possible, in preferred embodiments, mirror 106 is a MEMS mirror whose two-dimensional tilt is controlled based on the technology described in U.S. Pat. Nos. 6,265,239, 6,300,619, 6,366,414, and 6,392,221, the teachings of all of which are incorporated herein by reference.

Figure 2:
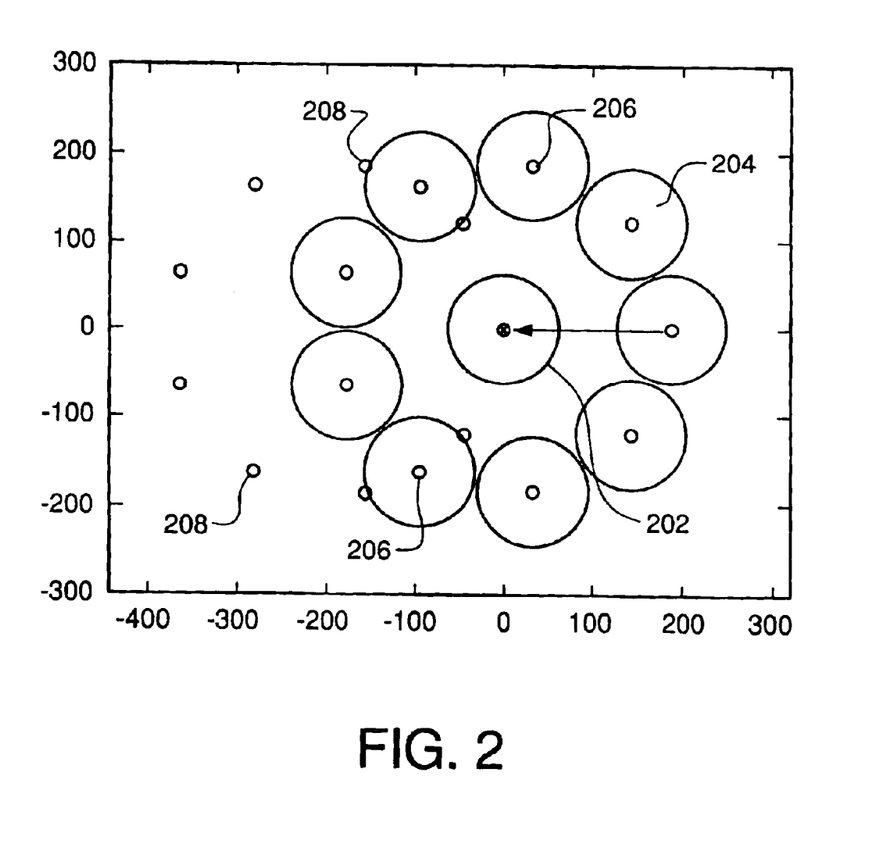
FIG. 2 shows a cross-sectional view of the fiber array of FIG. 1 taken perpendicular to the optical transmission axis.

FIG. 2 shows a cross-sectional view of fiber array 102 of FIG. 1 taken perpendicular to the optical transmission axis. As shown in FIG. 2, fiber array 102 has a single central fiber 202, located along the optical axis of lens 104, and nine outer fibers 204 arranged in a circular pattern around the central fiber.

Given the configurations of FIGS. 1 and 2, optical switch 100 can be operated as either a 1×M switch or an M×1 optical switch, with $2 \leq M \leq 9$. When operated as a 1×8 switch, central fiber 202 is the single input fiber and eight of the nine outer fibers 204 form the eight output fibers. Similarly, when operated as an 8×1 switch, central fiber 202 is the single output fiber and eight of the nine outer fibers 204 form the eight input fibers.

FIG. 2 also shows how the particular two-dimensional pattern of fiber array 102 substantially avoids undesirable crosstalk between fibers. In particular, FIG. 2 illustrates (using label 206) the core of each of the nine outer fibers 204. In addition, FIG. 2 illustrates (using labels 208) the position where light from each of the nine outer fibers 204 will fall on the two-dimensional fiber array pattern after passing through optical switch 100 when mirror 106 is oriented to couple a particular one of the nine outer fibers 204 to central fiber 202. As indicated in FIG. 2, for the nine-fiber circular arrangement of fiber array 102, when light from any one (and only one) outer fiber 204 is coupled to central fiber 202, light from any of the remaining eight outer fibers 204 will not be substantially coupled to any other fiber in the array.

Another advantage of the circular arrangement of fiber array 102 is that the outer fibers are all located at the same distance from the central fiber, so that coupling efficiency between fibers is uniform for all configurations of optical switch 100.

Depending on the application, the ninth outer fiber (i.e., the outer fiber that is not one of the eight input/output fibers) can be used as a spare and/or for self-monitoring purposes.

Experimental Results

Optical switch 100 of FIG. 1 was implemented in a bench-top experiment using a 0.875-mm diameter SOI (silicon-on-insulator) MEMS mirror. The resulting optical switch has an insertion loss of about 1.9 dB, a spectral flatness of less than 0.3 dB, and crosstalk level of less than −47 dB. The possible sources of the insertion loss are estimated in Table I. If the fiber-related losses (i.e., the first three in Table I) are significantly reduced or even eliminated, then the only losses that would remain would be due to mirror size and reflectance. In that case, optical switches could be implemented having a total insertion loss of less than 1 dB. Moreover, instead of increasing the size of the mirror, using a lens with a shorter focal length can reduce overfill of the mirror, thereby reducing insertion loss without having to increase the size of the mirror.

TABLE I

SOURCES OF INSERTION LOSS

| Source of optical loss | Loss (dB) |
| --- | --- |
| Uncoated fiber (AR) | 0.4 |
| Fiber polishing | 0.5 |
| 1 FC and 2 LC connectors | 0.5 |
| Mirror reflectance (Al coating R = 94%) | 0.3 |
| Mirror size (0.875 mm) | 0.2 |

System Control

In order for optical switch 100 to operate properly, the orientation of mirror 106 needs to be controlled in a reliable and cost-effective manner. One possible technique relies on a hardware-based, closed-loop, feed-back control mechanism. Such a control mechanism would rely on knowledge of the approximate orientation for mirror 106 for each different switch position. After achieving the approximate orientation for a particular switch position, the mirror could be dithered to generate a gradient-based error signal based on the magnitude of the coupled light to fine tune and maintain optimal mirror orientation. Another possible technique would be based on software algorithms programmed, e.g., into an FPGA (field programmable gate array). Such a control mechanism could be implemented either in an open-loop manner with a known orientation for each different switch position or in a closed-loop manner involving a suitable hill-climbing technique with optional dithering.

Packaging and Assembly

Figure 3A:
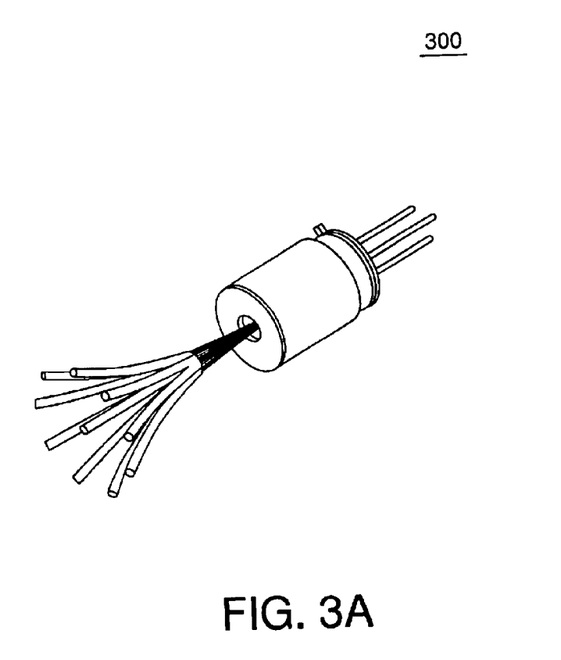
FIGS. 3A–D show different views of a packaged optical switch, according to one embodiment of the present invention.
Figure 3B:
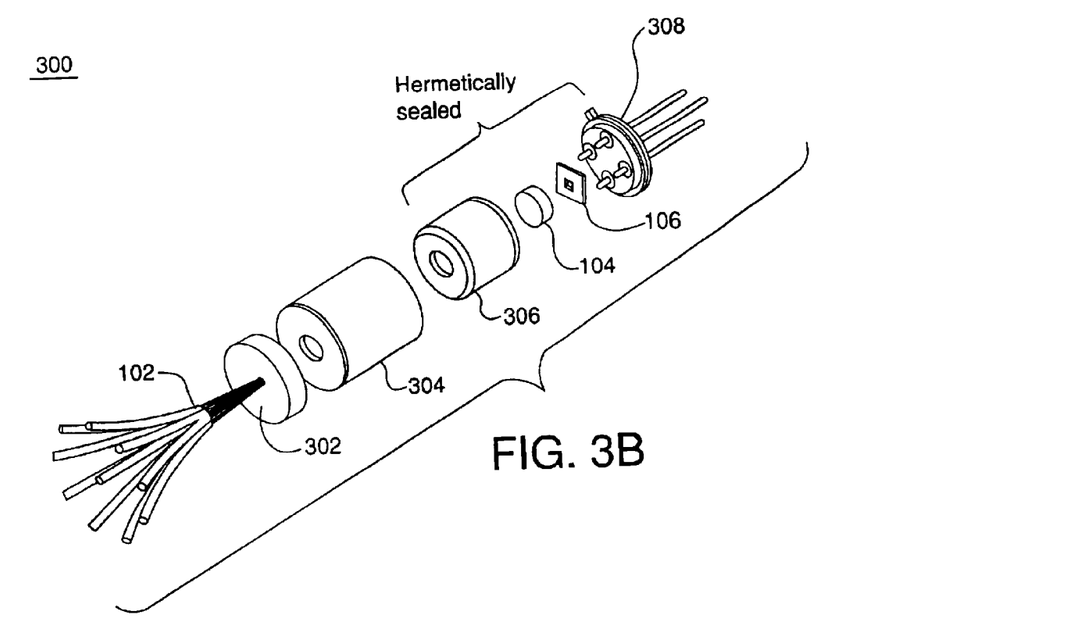
Figure 3C:
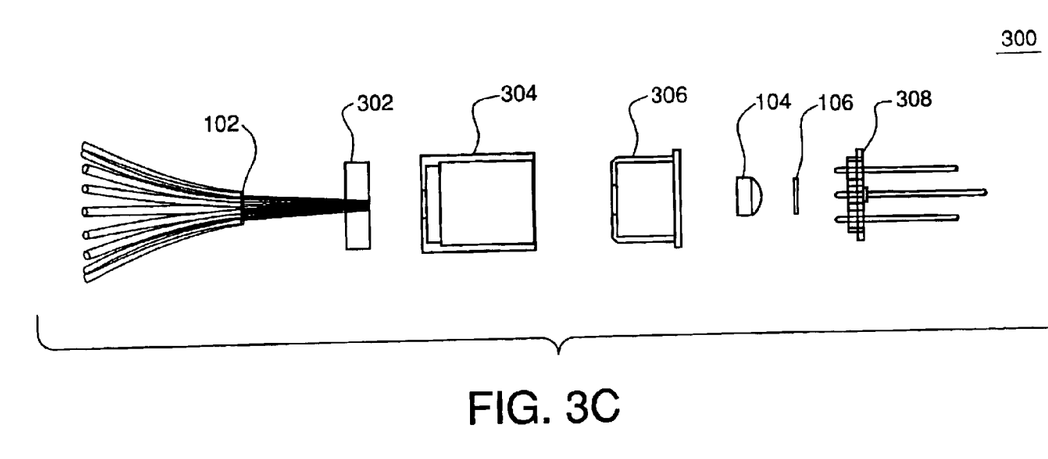
Figure 3D:
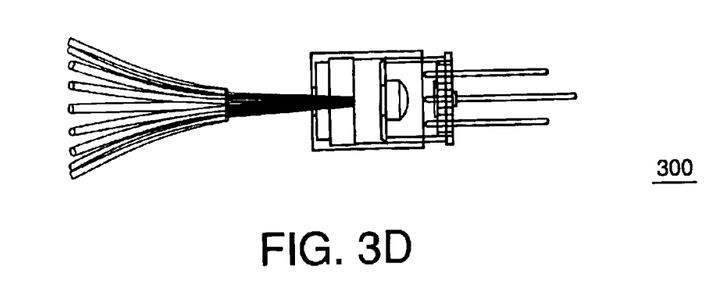

FIGS. 3A–D show different views of a packaged optical switch 300, according to one embodiment of the present invention. In particular, FIG. 3A shows a perspective view, FIG. 3B shows an exploded, perspective view, FIG. 3C shows an exploded, side, X-ray view, and FIG. 3D shows a side, X-ray view of the packaged optical switch.

Packaged optical switch 300 includes fiber array 102 of FIG. 1 mounted within mounting disk 302, fiber mount 304, lens mount 306, lens 104 of FIG. 1, MEMS mirror 106 of FIG. 1, and header 308 (e.g., a TO-5 type header). To assemble packaged optical switch 300, mounting disk 302 (with fiber array 102) is soldered within fiber mount 304, MEMS mirror 106 is die bonded and wire bonded to header 308, and lens 104 is soldered into the front end of lens mount 306. The lens mount (with lens 104) is then soldered onto the header (with MEMS mirror 106) preferably forming a hermetic seal. The lens mount/header assembly (with lens 104 and MEMS mirror 106) is then inserted within fiber mount 304 (with the mounting disk and fiber array 102 at one end). The distance from the proximal end of the fiber array to the lens should be adjustable with a resolution of 1 micron to minimize the insertion loss. Once the insertion loss is minimized, the two assemblies are then laser welded together to form the packaged optical switch of FIGS. 3A and 3D.

Fiber array 102 can be implemented by placing fibers in etched holes in a silicon or glass faceplate or by placing fibers in v-grooved silicon. These techniques are described in U.S. Pat. Nos. 5,135,590 and 5,185,846 and in *Optoelectronic Packaging*, Alan R. Mickelson, Nagesh R. Basavanhally, and Yung-Cheng Lee, editors, John Wiley & Sons, Inc., New York 1997, pp. 152–157, the teachings of all three of which are incorporated herein by reference. In principle, fiber arrays of any pattern and with any number of fibers can be fabricated using this technology.

Alternative Designs

Although the invention has been described in the context of a optical switches having an optical fiber array with a two-dimensional pattern consisting of a single central fiber surrounded by nine outer fibers arranged in a circular pattern around the central fiber, the invention is not so limited. In general, the invention can be implemented with any two-dimensional pattern of any number of fibers, although different patterns will typically provide different levels of protection against crosstalk. For example, it may be possible to position eight outer fibers in eight of the nine positions indicated in FIG. 2 without actually including a ninth outer fiber. Furthermore, depending on the application, the circular arrangement of outer fibers may include more or fewer than nine fiber positions. For example, a 1×4 or 4×1 switch may be implemented with a single central fiber and four or more outer fibers. Moreover, the outer fibers can be arranged in patterns other than a circle, including rectilinear (e.g., square), hexagonal, and even random patterns.

Alternative Fiber Arrays

Figure 4:
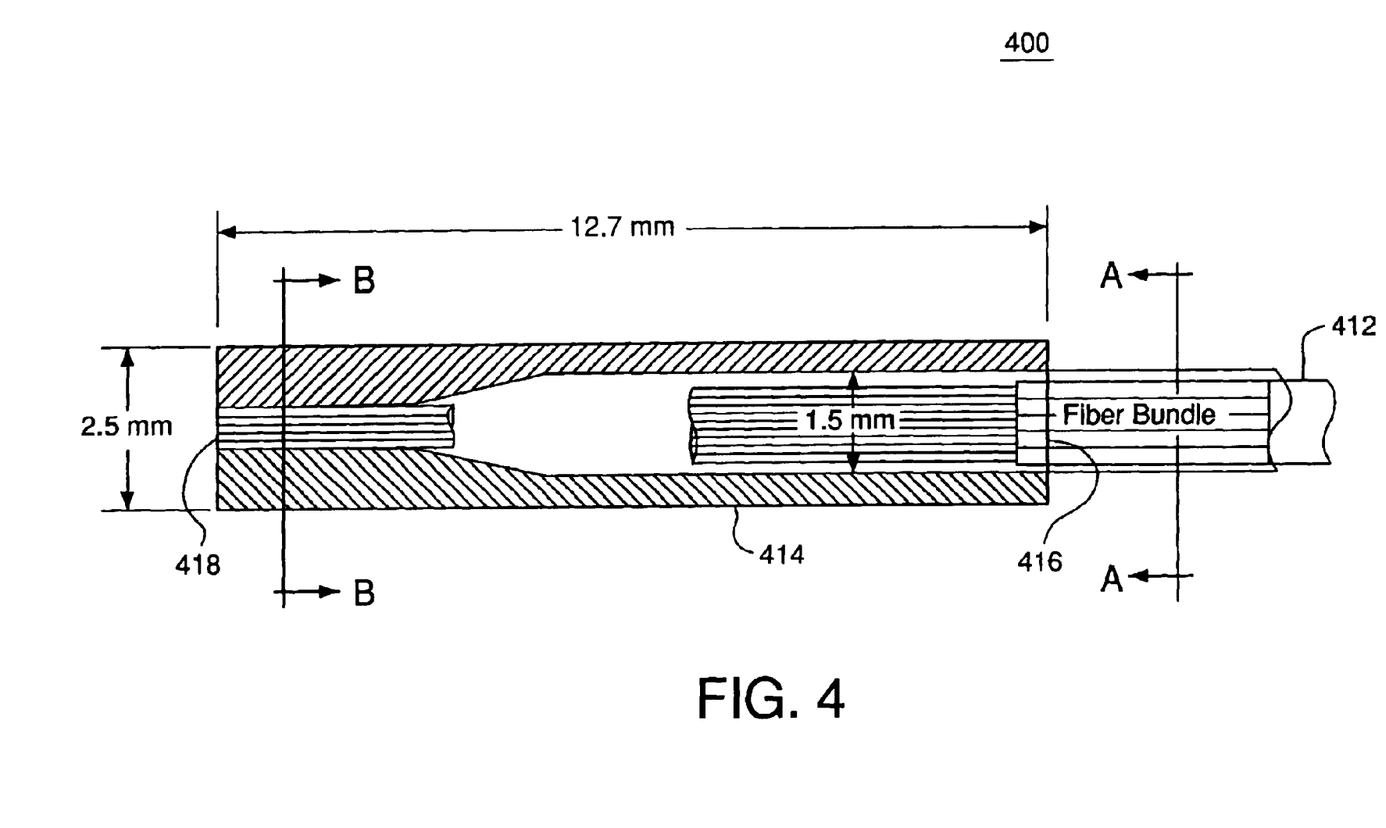
FIG. 4 shows a cross-sectional view of a bundled fiber array, taken parallel to the optical transmission axis, that can be used in optical switches such as the switch of FIG. 1.
Figures 5, 6, 8, 9:
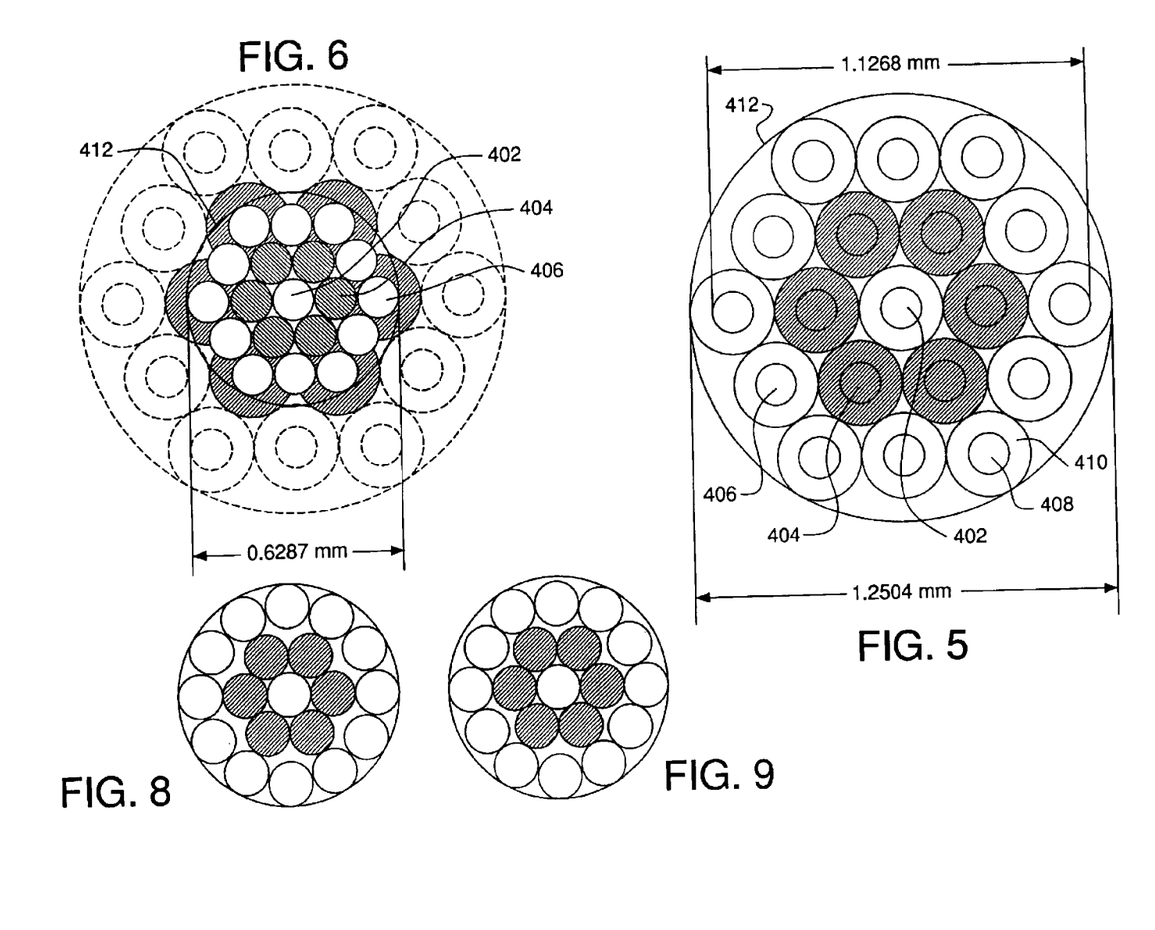
FIG. 5 shows a cross-sectional view of the bundled fiber array taken along axis A—A in FIG. 4.
FIG. 6 shows a cross-sectional, x-ray view of the bundled fiber array taken along axis B—B in FIG. 4.
FIGS. 8 and 9 show two other possible configurations for the outer layer of fibers in bundled fiber arrays, such as the bundled fiber array of FIG. 4.

FIG. 4 shows a cross-sectional view of a bundled fiber array 400, taken parallel to the optical transmission axis, that can be used in optical switches such as switch 100 of FIG. 1 instead of fiber array 102. FIG. 5 shows a cross-sectional view of bundled fiber array 400 taken along axis A—A in FIG. 4, while FIG. 6 shows a cross-sectional x-ray view of bundled fiber array 400 taken along axis B—B in FIG. 4.

Bundled fiber array 400 has nineteen coated optical fibers arranged in three concentric layers: one central fiber 402, six intermediate fibers 404, and twelve outer fibers 406. As represented in FIG. 5, each coated fiber includes an inner glass core 408 and an outer fiber coating 410. Surrounding the bundle of nineteen fibers is a soft polymer tube 412. One end of the fiber/tube assembly is housed within a tapered metal ferrule 414, having a relatively wide opening 416 at one end and a relatively narrow opening 418 at the other end. In one implementation, ferrule 414 is an FIS Stainless Steel Alloy Ferrule # F1-0061F from Fiber Instrument Sales, Inc., of Oriskany, N.Y. Such a ferrule has an outer diameter (OD) of about 2.5 mm, a wide-end inner diameter (ID) of about 1.5 mm, and a narrow-end ID of about 0.63 mm.

Figure 7:
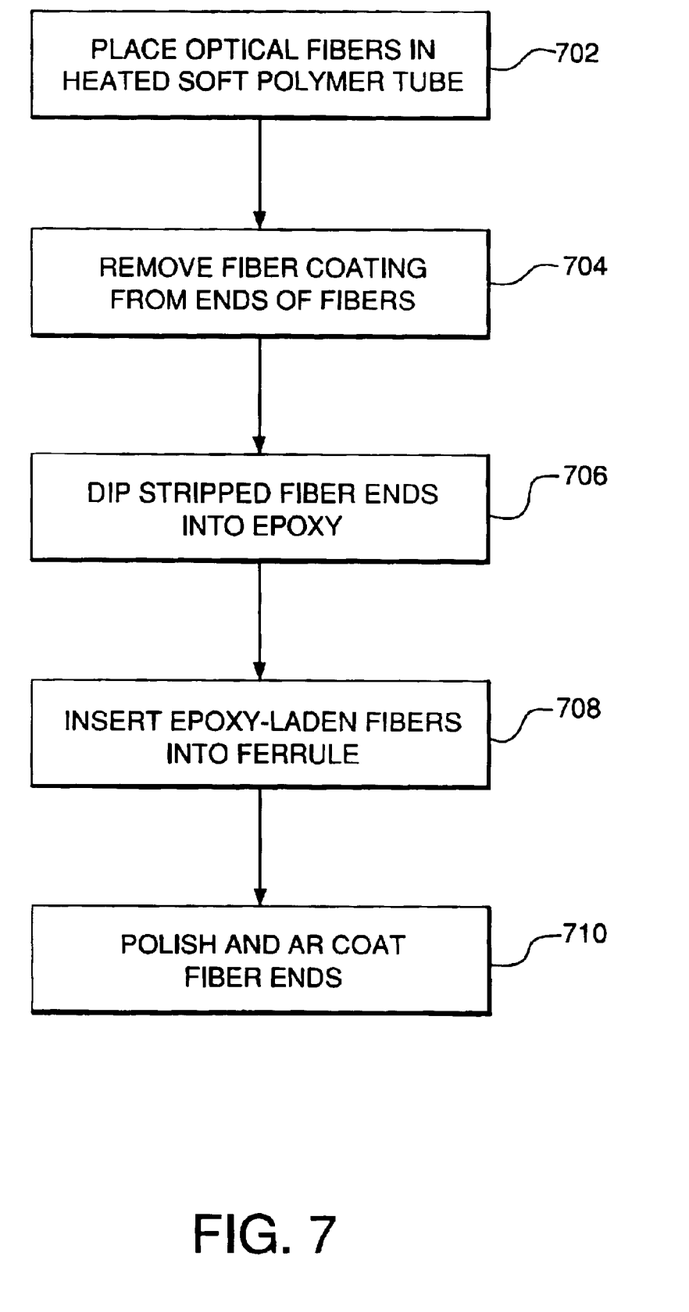
FIG. 7 shows a flow diagram of the processing involved in implementing the bundled fiber array of FIG. 4, according to one embodiment of the present invention.

FIG. 7 shows a flow diagram of the processing involved in implementing bundled fiber array 400 according to one embodiment of the present invention. According to this embodiment, the nineteen coated optical fibers are placed in a heated, soft polymer tube 412 having an (unheated) ID of about 1.19 mm, with about 20–25 mm of the optical fibers extending beyond the end of the polymer tube (step 702 of FIG. 7). The tube is preferably heated to about 50 C to expand the ID to allow the fibers to be freely inserted. After fiber insertion, the polymer tube is cooled causing the fibers in the tube to form a stable "circular" structure, as represented in FIG. 5.

The fiber coating is then stripped off a length of about 15 mm at the ends of the fibers extending beyond the end of the polymer tube by dipping the fiber ends in either methylene chloride or hot sulfuric acid (step 704). The fibers are then dried. The stripped fiber bundle end is then dipped into an epoxy (step 706), which acts as (1) a lubricating agent, (2) alignment material via surface tension, and (3) potting material. The epoxy-dipped bundle is then slid into the wide end of the ferrule and tapered down into the narrow end until the fibers slightly protrude from the end of the ferrule (step 708). After the epoxy is cured, the fibers protruding from the narrow end of the ferrule are cut, polished, and AR coated to form the final assembly of bundled fiber array 400 (step 710).

The nineteen-fiber bundled array can then be assembled into an optical switch as in FIG. 1. In preferred implementations, central fiber 402 forms the central fiber of the fiber array for a 1×M or M×1 optical switch, while M of the twelve outer fibers 406 form the M outer fibers of the fiber array, where $2 \leq M \leq 12$. The six intermediate fibers 404 function as spacers and are not used as active input/output fibers in the optical switch.

As before, those skilled in the art will understand that optical switches of the invention may be implemented using bundled fiber arrays with alternative configurations, including different numbers of layers and/or different numbers of fibers in the various layers.

As shown in FIG. 6, the twelve outer fibers in bundled fiber array 400 are arranged in a hexagon centered at central fiber 402. FIG. 8 shows another possible configuration in which the twelve outer fibers are arranged in a circle centered at the central fiber. These two configurations correspond to two extreme cases, where FIG. 6 corresponds to the twelve outer fibers located as close to the central fiber as possible, while FIG. 8 corresponds to the twelve outer fibers located as far from the central fiber as possible. In general, the twelve outer fibers will be randomly arranged in a pattern that ranges from one extreme to the other. FIG. 9, for example, shows the twelve outer fibers in a such a random configuration with each fiber located on either the hexagon or the circle or somewhere between the hexagon and the circle. Statistical analysis indicates that substantially low levels of crosstalk are provided by optical switches implemented using bundled fibers arrays having any of these different configurations.

As suggested earlier, although the invention has been described in the context of an optical switch having a lens between the fiber array and the mirror, an optical switch of the invention can be implemented without such a lens. One possible scheme would be to use miniature collimated fiber pigtails to make the fiber array and direct all the light beams towards the mirror. In this configuration, there is no need for a collimating lens, which would eliminate the fiber-to-lens distance adjustment. In this case, the pointing direction of each collimated fiber may need to be set during the assembly process of the fiber array so that light from any of the fibers will strike the center of the mirror.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. An optical switch comprising:
   an array of optical fibers disposed in a two-dimensional pattern; and
   a mirror having two-dimensional tilt control and adapted to be controlled to reflect light received simultaneously from two or more of the optical fibers in the fiber array back to the fiber array such that the reflected light from at least one of the optical fibers enters at least one different one of the optical fibers, wherein:
   the two-dimensional pattern comprises a central optical fiber and a plurality of other optical fibers positioned around the central optical fiber; and
   for each possible set of input/output fibers comprising the central optical fiber and two or more of the other optical fibers, when the mirror is oriented to couple the central optical fiber to only one of the other input/output fibers, no other pair of input/output fibers are substantially coupled to each other.

2. The invention of claim 1, further comprising a lens positioned between the fiber array and the mirror such that light received from the fiber array passes through the lens to the mirror and the reflected light from the mirror passes through the lens back to the fiber array.

3. The invention of claim 2, wherein the mirror is a MEMS mirror and the optical switch is packaged with:
   the MEMS mirror mounted onto a header and sealed within an enclosure formed by the header and a lens mount;
   the lens mounted onto the lens mount and sealed within the enclosure;
   the fiber array mounted onto a fiber mount; and
   the fiber mount and lens mount connected together at a distance between the fiber array and the lens that minimizes insertion loss for the optical switch.

4. The invention of claim 3, wherein the MEMS mirror and the lens are hermetically sealed within the enclosure.

5. The invention of claim 3, wherein the distance between the fiber array and the lens is empirically selected to minimize the insertion loss for the optical switch.

6. The invention of claim 1, wherein the plurality of other optical fibers are positioned in a circular arrangement around the central optical fiber.

7. The invention of claim 6, wherein:
   the optical switch is adapted to operate as either a 1×M switch or an M×1 switch, where M>1; and
   the plurality of other optical fibers positioned in the circular arrangement comprises more than M optical fibers.

8. The invention of claim 7, wherein:
   the optical switch is adapted to be operated as either a 1×8 switch or an 8×1 switch; and
   the circular arrangement consists of nine optical fiber positions.

9. The invention of claim 1, wherein the array of optical fibers comprises a bundle of optical fibers housed within a ferrule.

10. The invention of claim 1, wherein the array of optical fibers comprises a central fiber, an intermediate layer of fibers, and an outer layer of fibers, wherein the central fiber and two or more fibers of the outer layer of fibers form a set of input/output fibers of the optical switch.

11. The invention of claim 1, wherein the light received simultaneously from the two or more optical fibers in the fiber array is reflected by a single reflective element of the mirror back to the fiber array.

12. The invention of claim 1, wherein the mirror consists of a single reflective element.

13. A method for fabricating an optical switch comprising:
   mounting a mirror having two-dimensional tilt control and a lens within a hermetically sealed enclosure; and
   connecting an array of optical fibers disposed in a two-dimensional pattern to the hermetically sealed enclosure, such that:
   the mirror is adapted to be controlled to reflect light received simultaneously from two or more of the optical fibers in the fiber array back to the fiber array, wherein the reflected light from at least one of the optical fibers enters at least one different one of the optical fibers; and
   the lens is positioned between the fiber array and the mirror such that light received from the fiber array passes through the lens to the mirror and the reflected light from the mirror passes through the lens back to the fiber array.

14. The invention of claim 13, wherein the mirror is a MEMS mirror and the optical switch is packaged with:
   the MEMS mirror mounted onto a header and sealed within the hermetically sealed enclosure formed by the header and a lens mount;
   the fiber array mounted onto a fiber mount; and
   the fiber mount and lens mount connected together at a distance between the fiber array and the lens that minimizes insertion loss for the optical switch.

15. The invention of claim 14, further comprising empirically selecting the distance between the fiber array and the lens to minimize the insertion loss for the optical switch.

16. The invention of claim wherein:
   the two-dimensional pattern comprises a central optical fiber and a plurality of other optical fibers positioned around the central optical fiber;
   for each possible set of input/output fibers comprising the central optical fiber and two or more of the other optical fibers, when the mirror is oriented to couple the central optical fiber to only one of the other input/output fibers, no other pair of input/output fibers are substantially coupled to each other.

17. The invention of claim 16, wherein:
   the plurality of other optical fibers are positioned in a circular arrangement around the central optical fiber;
   the optical switch is adapted to operate as either a 1×M switch or an M×1 switch, where M>1; and
   the plurality of other optical fibers positioned in the circular arrangement comprises more than M optical fibers.

18. The invention of claim 13, wherein the array of optical fibers comprises a central fiber, an intermediate layer of fibers, and an outer layer of fibers, wherein the central fiber and two or more fibers of the outer layer of fibers form a set of input/output fibers of the optical switch.

19. An optical switch fabricated using the method of claim 13.

20. An optical switch comprising:
   an array of optical fibers disposed in a two-dimensional pattern; and
   a mirror having two-dimensional tilt control and adapted to be controlled to reflect light received simultaneously from two or more of the optical fibers in the fiber array back to the fiber array such that the reflected light from at least one of the optical fibers enters at least one different one of the optical fibers, wherein the array of optical fibers comprises:

a central fiber;

an intermediate layer of fibers; and an outer layer of fibers, wherein:

the fibers in the intermediate layer function as spacers between the central fiber and the fibers in the outer layer and are not adapted to be coupled to transmit light;

the central fiber and two or more fibers in the outer layer are adapted to be coupled to transmit light.

21. The invention of claim 20, wherein the intermediate layer has exactly six fibers and the outer layer has exactly twelve fibers.

22. The invention of claim 21, wherein the twelve fibers are arranged in a pattern that falls within a range from a circle to a hexagon, inclusive.

23. The invention of claim 20, wherein the array of optical fibers consists of the central fiber, the fibers in the intermediate layer, and the fibers in the output layer.

* * * * *